United States Patent [19]

Bridges

[11] Patent Number: 5,076,655
[45] Date of Patent: Dec. 31, 1991

[54] ANTENNA-FED ELECTRO-OPTIC MODULATOR

[75] Inventor: William B. Bridges, Pasadena, Calif.

[73] Assignee: Hughes Aircraft Company, Los Angeles, Calif.

[21] Appl. No.: 555,684

[22] Filed: Jul. 19, 1990

[51] Int. Cl.$^5$ .................... G02B 6/10; H01Q 21/08; G02F 1/00

[52] U.S. Cl. .......................... 385/3; 343/824; 343/853; 385/14; 385/132; 385/2; 359/245

[58] Field of Search .............. 350/96.11, 96.12, 96.13, 350/96.14, 96.15; 342/423, 424, 432, 436; 343/751, 853, 824; 455/610, 611, 612

[56] References Cited

U.S. PATENT DOCUMENTS

| | | | |
|---|---|---|---|
| 4,714,311 | 12/1987 | Auracher | 350/96.11 |
| 4,739,334 | 4/1988 | Soref | 342/368 |
| 4,903,029 | 2/1990 | Newberg | 342/172 |

*Primary Examiner*—Brian Healy
*Attorney, Agent, or Firm*—Paul M. Coble; W. K. Denson-Low

[57] ABSTRACT

An optical waveguide (34) is formed in a substrate (32) made of an electro-optic material. A plurality of stripline electrodes (36) are formed on the substrate (32) in spaced relation along the optical waveguide (34). A stripline antenna (38) is connected to the upstream end of each electrode (36). An electromagnetic waveguide (40) directs an electromagnetic signal to the antennas (38), which couple the electromagnetic signal to the electrodes (36). The electromagnetic signal propagates along the electrodes (36) and electro-optically modulates an optical signal propagating parallel thereto through the optical waveguide (34). The elctromagnetic waveguide (40) may direct the electromagnetic signal through the substrate (32) to the antennas (38) at an angle with the optical waveguide (34) selected to cause the electromagnetic signal to propagate through the substrate (32) in such a direction that the phase velocity of the electromagnetic wave along the direction of the optical waveguide (34) is substantially equal to the phase velocity of the optical signal propagating through the optical waveguide (34). Alternatively, the substrate (32') may be dimensioned to constitute the electromagnetic waveguide such that the electromagnetic signal propagates therethrough parallel to the optical waveguide (34) at the same phase velocity as the optical signal. The electromagnetic waveguide may also be provided as a separate dielectric waveguide (62) which extends parallel to the optical waveguide (34). An optical waveguide (94) may be split into two branches (94c, 94d) to enable amplitude modulation of the optical signal.

17 Claims, 7 Drawing Sheets

ANTENNA-FED ELECTRO-OPTIC MODULATOR

BACKGROUND OF THE INVENTION

1. Field of the Invention

The present invention generally relates to the art of optical communications, and more specifically to an electro-optic modulator configuration and method which enable modulation of an optical carrier with electrical signals having extremely high frequencies.

2. Description of the Related Art

Fiber optic links are becoming increasingly important in a wide variety of applications such as millimeter wave communications and radar systems. An external electro-optic modulator is usually required for a millimeter wave fiber optic link since direct modulation of a solid state laser signal is generally not possible above microwave frequencies.

Travelling wave integrated optic modulators used for this purpose are known in the art, such as described in a paper entitled "17 GHz bandwidth electro-optic modulator", by C. Gee et al, in Applied Physics Letters, vol. 43, no. 11, Dec. 1, 1983, pp. 998-1,000. A typical traveling wave modulator is illustrated in FIG. 1 and generally designated as 10. The modulator 10 includes a substrate 12 formed of an electro-optic material, preferably crystalline lithium niobate ($LiNbO_2$) An optical waveguide 14 is formed in the substrate 12 just below the surface of the crystal by ion diffusion of titanium or proton exchange. The waveguide 14 is single mode, and typically only a few microns wide.

An optical signal from a laser or the like is fed into an input 16 and retrieved from an output 18 of the waveguide 14 using focussing lenses or by close coupling to single mode optical fibers (not shown). A microwave stripline electrode 20 including first and second segments 20a and 20b respectively is deposited on the surface of the substrate 12 immediately adjacent to the optical waveguide 14. An electrical signal at microwave or higher frequency is applied across the segments 20a and 20b through a coaxial cable 22. The electrode 20 is terminated in a resistive load 24 via a coaxial cable 26. The electrical signal applied to the electrode 20 through the cable 22 propagates along the electrode 20 parallel to the optical waveguide 14 as a traveling wave.

The segments 20a and 20b are sufficiently small and close together that the transverse electric field therebetween resulting from the electrical signal propagating along the electrode 20 passes through the optical waveguide 14 and induces an incremental phase shift in the optical signal via the electro-optic effect. This incremental phase shift is integrated along the length of the optical waveguide 14 to produce the net phase modulation. Although a phase modulator is illustrated in FIG. 1, the optical waveguide can be split into two branches in a Mach-Zehnder type interferometer arrangement to provide amplitude modulation as described in the above referenced article to Gee et al.

The integrated effect of the incremental phase shift is cumulative as long as the optical and electrical signals propagate parallel to each other at the same phase velocity. However, this does not occur in practical electro-optic materials such as $LiNbO_2$. At optical frequencies, the refractive index of $LiNbO_2$ is $n_o=2.2$, whereas at microwave and millimeter wave frequencies the refractive index is $n_{mm}=5.3$ to 6.6, depending on the orientation ($LiNbO_2$ is anisotropic). Since the electric field between the segments 20a and 20b of the stripline electrode 20 passes through both air and $LiNbO_2$, the effective index of refraction for the electrical signal travelling along the electrode 20 is on the order of $n_{eff}=4$. This is still a mismatch with the $n_o=2.2$ for the optical signal.

FIG. 2 illustrates the phase displacement of the electrical and optical signals as a function of distance of travel along the electrode 20. Due to the refractive index mismatch, the optical signal propagates with a phase velocity which is approximately twice that of the electrical signal. The magnitude of the phase modulation progressively decreases as the phase difference between the optical and electrical signals increases. This phenomenon is known as a phase "walk off". The decrease in overall phase modulation with frequency f and interaction length L is equal to $[(sin(AfL))/AfL]^2$, where $A=2\pi/c(n_{eff}-n_o)$, and c is the speed of light.

This velocity mismatch necessitates design tradeoffs. The maximum achievable drive electrical drive signal frequency f decreases as the interaction length L is increased. Conversely, to lower the drive voltage and power, a long interaction length L is required. The modulator must be made shorter and the drive power larger as the frequency is increased to obtain satisfactory modulation.

Prior art attempts to compensate for this phase velocity mismatch include replacing the single electrode 20 with a periodic electrode structure such as described in a paper entitled "Velocity-matching techniques for integrated optic travelling wave switch/modulators", IEEE Journal of Quantum Electronics, vol. QE-20, no. 3, March 1984, pp. 301-309. These periodic electrode structures can be categorized into either periodic phase reversal or intermittent interaction electrodes. Known intermittent interaction electrode configurations include unbalanced transmission lines, i.e., asymmetric about the propagation axis. This leads to incompatibilities with the balanced line (typically coaxial or waveguide probe) transitions to other fiber optic link transmitter components.

The periodic phase reversal structures break up the electrode 20 into shorter sections, and force the phase shift between the sections to match the optical phase shift, as illustrated in FIG. 3. In the Figure, the electrode is assumed to consist of four sections, with a 180° phase shift between the individual sections. The relative phase of the optical and electrical signals is effectively reset at the leading or upstream end of each section, and deviates to a maximum extent which is inversely proportional to the length of the sections. Thus, the phase velocities are matched on the average. However, there is still a reduction in the modulation by the factor $[sin(AfL_{section})/AfL_{section}]^2$, and $L_{section}$ is required to be long enough to produce a 180° phase delay. This also means that the 180° phase reversals are correct only at a single modulation frequency, so that the structure of FIG. 1, which is a low-pass modulator, is converted into a bandpass modulator.

Other problems that make it difficult to extend the operation of such modulators, both of conventional types such as shown in FIG. and the phase reversal types described above with reference to FIG. 3, to millimeter wave or higher frequencies, involve the connection of modulation electrodes to the modulation signal source by coaxial cables, or through wire bonds or the like. This becomes unmanageable due to the extremely small physical dimensions involved.

SUMMARY OF THE INVENTION

The present invention replaces the single electrical modulation electrode 20 illustrated in FIG. 1 with a plurality of short electrodes or sections in accordance with the general principle discussed above with reference to FIG. 3. However, the invention improves on the prior art by eliminating the 180° phase reversal requirement, and achieving the phasing of the short electrodes while avoiding the difficulties associated with connections to coaxial or other ohmic feeds. The present invention also allows much shorter electrode length per section so that an arbitrarily small reduction in modulation can be realized. This is done by connecting each electrode to a planar antenna, and illuminating the antennas with an electromagnetic wave modulating signal which propagates in such a manner that it has a phase velocity along the direction of the optical waveguide which is equal to the phase velocity of the optical signal.

More specifically, an optical waveguide is formed in a substrate made of an electro-optic material. A plurality of stripline electrodes are formed on the substrate in spaced relation along the optical waveguide. A stripline antenna is connected to the upstream end of each electrode. An electromagnetic waveguide directs an electromagnetic signal to the antennas, which couple the electromagnetic signal to the electrodes. The electromagnetic signal propagates along the electrodes and electro-optically modulates an optical signal propagating parallel thereto through the optical waveguide. The electromagnetic waveguide may direct the electromagnetic signal through the substrate to the antennas at an angle with the optical waveguide selected to cause the electromagnetic signal to propagate through the substrate in such a direction that the phase velocity of the electromagnetic wave along the direction of the optical waveguide is substantially equal to the phase velocity of the optical signal propagating through the optical waveguide. Alternatively, the substrate may be dimensioned to constitute the electromagnetic waveguide such that the electromagnetic signal propagates therethrough parallel to the optical waveguide at the same phase velocity as the optical signal. The electromagnetic waveguide may also be provided as a separate dielectric waveguide which extends parallel to the optical waveguide. The optical waveguide may be split into two branches to enable amplitude modulation of the optical signal.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 4:
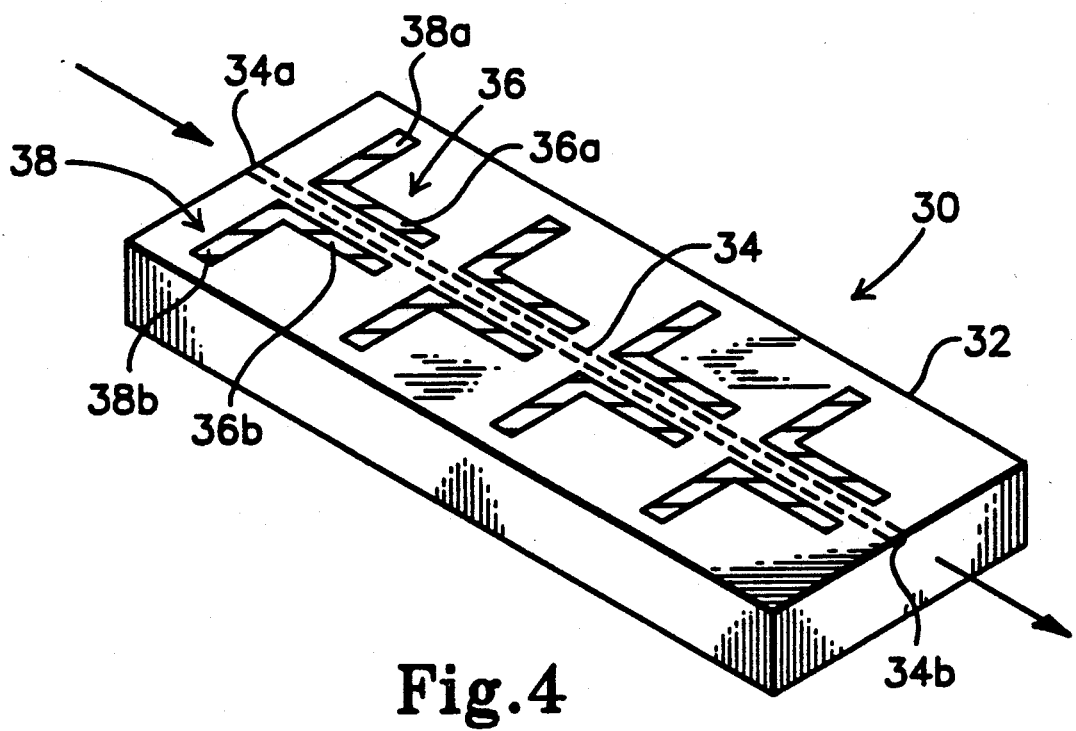
FIG. 4 is a simplified perspective view of an electro-optic phase modulator embodying the present invention.

Referring now to FIG. 4 of the drawing, an electro-optic phase modulator embodying the present invention is generally designated as 30, and includes a substrate 32 made of a material such as $LiNbO_2$ which exhibits the electro-optic effect. An optical waveguide 34 is formed in the upper surface of the substrate 32 by diffusion of titanium, cadmium, or other material into the substrate 32 through a mask (not shown), so that the index of refraction of the material in the waveguide 34 is higher than the index of refraction of the material of the substrate 32. An optical signal to be modulated is fed into the waveguide 34 at an optical input 34a thereof by a focussing lens arrangement or an optical fiber (not shown), and propagates through the waveguide 34 to an optical output 34b from which it is suitably coupled to an optical fiber link or the like (not shown).

The modulator 30 further includes a plurality of stripline electrical modulation waveguides or electrodes 36 which are spaced from each other along the optical waveguide 34. Each electrode 36 includes two stripline segments 36a and 36b which are spaced on opposite sides of the optical waveguide 34 in close proximity thereto.

Figure 1:
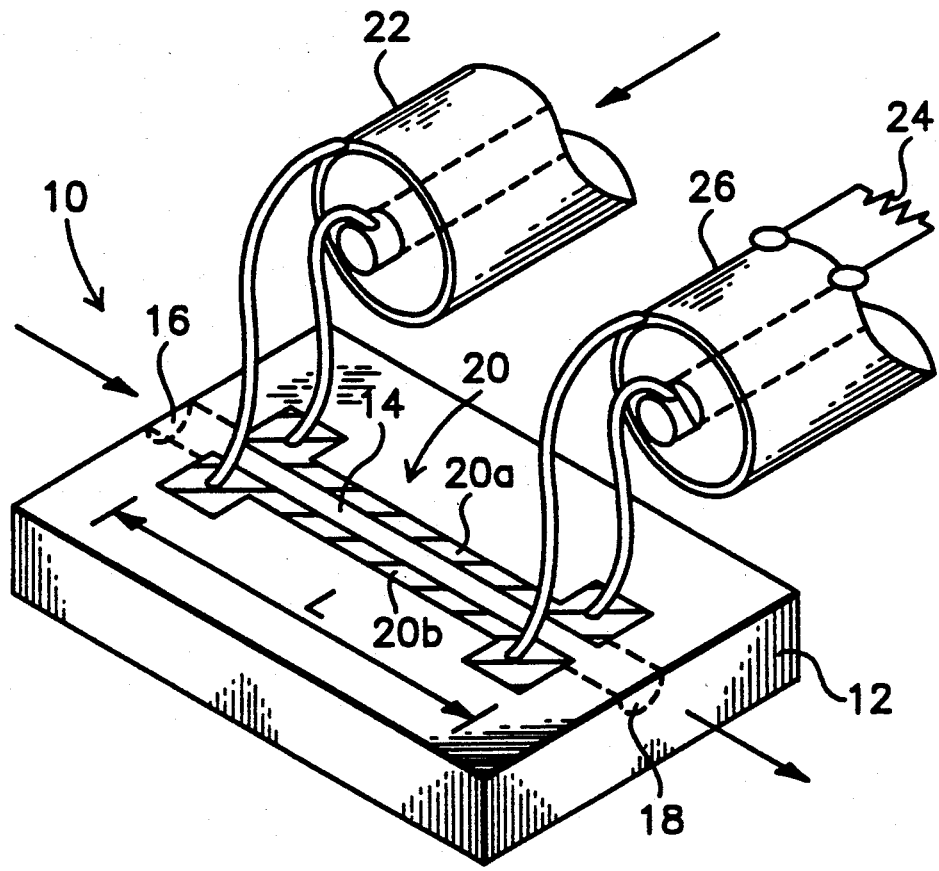
FIG. 1 is a simplified perspective view of a prior art electro-optic phase modulator.
Figure 2:
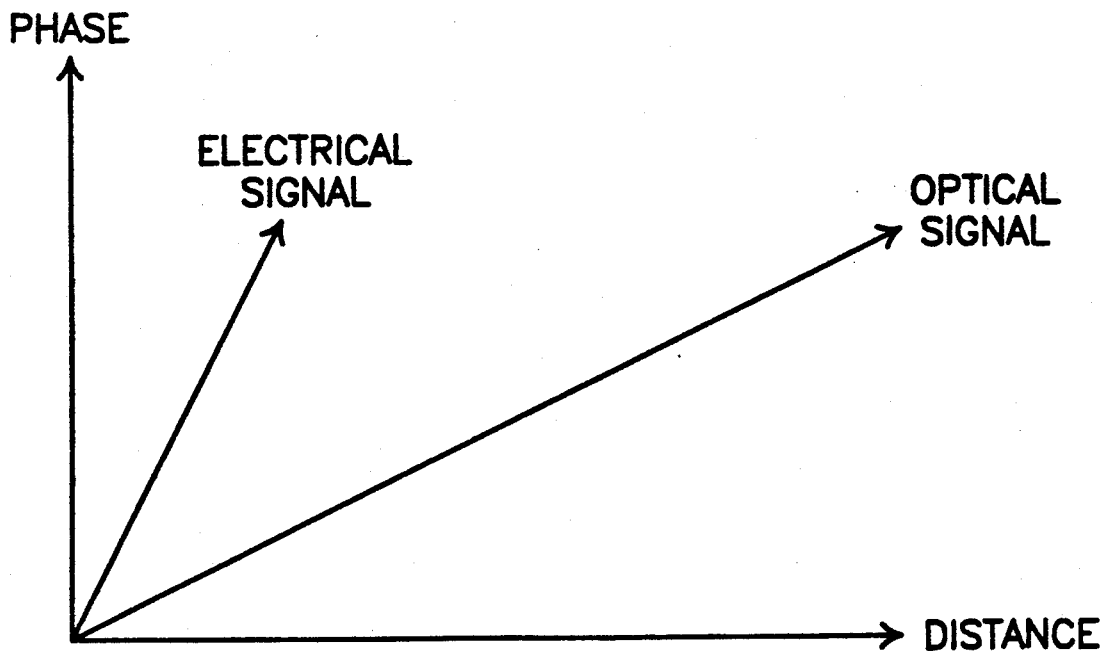
FIG. 2 is a graph illustrating the phase velocity mismatch between optical and electrical signals in the modulator of FIG. 1.
Figure 3:
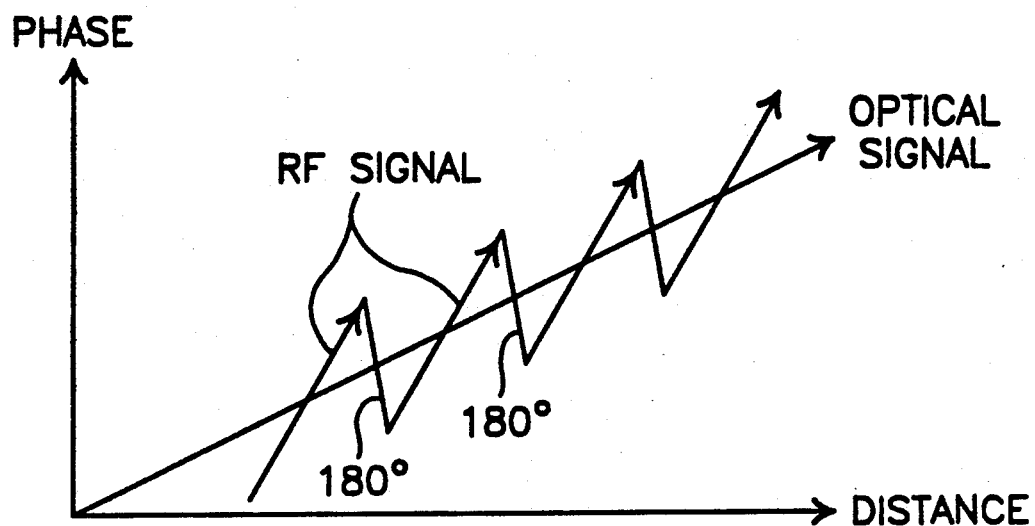
FIG. 3 is a graph illustrating a known method of reducing the phase mismatch shown in FIG. 2.

Although four electrodes 36 are illustrated in the drawing, the invention is not so limited, and a particular modulator configuration may have any suitable number of electrodes 36 which is limited only by the ability of the electromagnetic waveguide to illuminate them. Since the electrodes 36 are all driven with the proper phase, no particular spacing or phasing constraints are involved, such as the 180° phase reversal required in the prior art as described with reference to FIG. 3. In particular, a larger number of electrodes 36 with substantially smaller phase mismatches than in the prior art may be provided in accordance with the present invention.

Antennas 38 which each include segments 38a and 38b are formed on the substrate 32 and electrically connected to the upstream ends of the segments 36a and 36b of the electrodes 36 respectively. The electrodes 36 and antennas 38 are made of an electrically conductive material such as gold or aluminum, and may be evaporated or otherwise formed on the surface of the substrate 32 in an integral step. The antennas 38 are illustrated as being simple dipoles. However, the invention is not limited to any particular antenna configuration, and the simple dipoles may be replaced by any other type of antenna such as a bow-tie antenna (not shown) which may operate more efficiently in a particular application.

Figure 5:
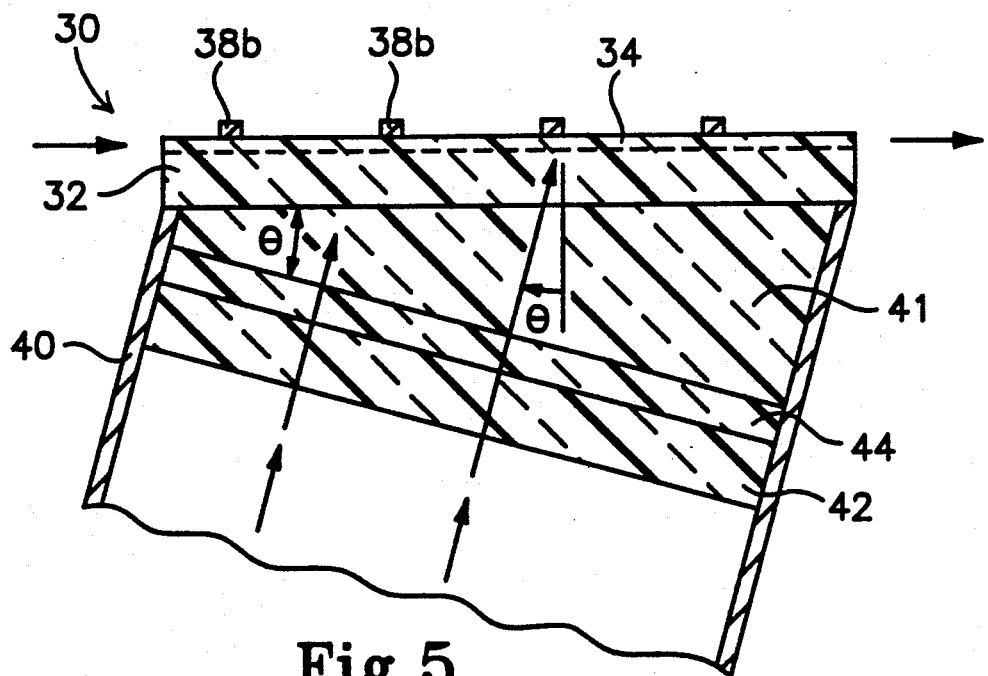
FIG. 5 is a partial sectional view illustrating a first method of electromagnetically driving the modulator of FIG. 4 through its substrate.

Referring now to FIG. 5, the modulator 30 further includes means for electromagnetically illuminating the antennas 38 at the phase velocity $c/n_o$ of the optical wave propagating through the optical waveguide 34. An electromagnetic waveguide 40 directs an electromagnetic modulating signal at a microwave or higher frequency onto the antennas 38 through the substrate 32. The waveguide 40 may be of any suitable type, and generally includes an electrically conductive tube having a cross section selected to enable propagation of the electromagnetic signal therethrough. The electromagnetic signal may be generated by a klystron oscillator or the like (not shown). For the simple dipole antennas shown, the $TE_{10}$ waveguide mode with the electric field polarization normal to the plane of the drawing should be used. Alternative antenna configurations may utilize different waveguide modes and polarizations in accordance with known design principles.

The waveguide 40 is configured so that the electromagnetic signal is directed thereby through the substrate 32 to the antennas 38 at an angle $\theta$ to a line extending perpendicular to the plane of the antennas 38 and the optical waveguide 34. The angle $\theta$ is selected to cause the electromagnetic signal to propagate through the substrate 32 in such a direction that the phase velocity of the electromagnetic wave along the direction of the optical waveguide 34 is substantially equal to the phase velocity $c/n_o$ of the optical signal propagating through the optical waveguide 34. The electromagnetic signal is electromagnetically induced in and thereby received by the antennas 38, and coupled therefrom to the electrodes 36. The electromagnetic signal propagates along the electrodes 36 parallel to the optical signal in the waveguide 34, thereby causing electro-optic modulation of the optical signal.

Illuminating the antennas 38 with the electromagnetic signal at the angle $\theta$ causes all of the antennas 38 to be driven with the proper phase without resorting to coaxial leads or wire bonds as in the prior art. Although the electromagnetic signal propagating through the substrate 32 has the same phase velocity $c/n_o$ parallel to the optical waveguide 34 as the optical signal, the phase velocity of the electromagnetic signal is reduced to the lower value of $c/n_{eff}$ after being induced in the electrodes 36. However, the phase mismatch is reduced by providing a plurality of short electrodes 36 rather than a single electrode 20 as described with reference to the graph of FIG. 3. The larger the number of electrodes 36 for a given interaction length L, the smaller the cumulative phase mismatch. The angle $\theta$ is equal to $\sin^{-1}(n_o/n_{mm})$, and has a value of approximately 20° for $LiNbO_2$. This calculation is derived from the principle of k-vector wave matching, as described in an article entitled "964 GHz TRAVELING WAVE ELECTRO-OPTIC LIGHT MODULATOR", by I. Kaminow et al, in Applied Physics Letters vol. 16, no. 11, June 1, 1970, pp. 416-418.

Although the waveguide 40 is effective in directing the electromagnetic signal to the antennas 38 through the substrate 32, a significant proportion of the electromagnetic signal may be reflected from the lower surface of the substrate 32 back into the waveguide 40. This effect is deleterious in that the signal power available to illuminate the antennas 38 is reduced. This undesirable effect may be reduced substantially by providing impedance matching means between the waveguide 40 and substrate 32 for smoothing the signal transition therebetween. This reduces the reflection and enables a greater proportion of the signal to reach the antennas 38.

One method for reducing the reflection at the interface is through the use of matching layers as illustrated in FIG. 5. A wedge 41 of a low loss dielectric material with substantially the same refractive index as the substrate 32, $n_{mm}$, and cut with a wedge angle $\theta$, is used to eliminate reflection and refraction at the interface between the substrate 32 and wedge 41. Alternatively, the wedge 41 may simply be an extension of the substrate 32. One or more matching layers are applied to the other surface of the wedge 41 to reduce or eliminate the normal incidence reflection of the wave at that surface; two such layers 42 and 44 are shown in FIG. 5. The prescription for choosing the dielectric constants and thicknesses of the matching layers is well known in the art as presented, for example, in a textbook entitled "Fields and Waves in Modern Electronics", by S. Ramo, et al, published by J. Wiley, New York, 1984, Section 6.14: "Multiple Dielectric Boundaries with Oblique Incidence." Simple examples of such layers are often called "quarter wave" matching layers. The matching layers may be applied to the back side of the wedge shaped block as shown in FIG. 5 or, although not illustrated, directly to the backside of the planar modulator substrate. In the latter case, the wave from the waveguide 40 would be incident on the matching layers at oblique incidence, and the physical angle made by the waveguide with respect to the substrate surface normal will no longer, in general, be $\theta$, but can be calculated by repeated application of Snell's Law so as to make the angle of incidence within the substrate 32 equal to $\theta$. The choice of dielectric constants and thickness for the layers can be determined from the information in the Ramo publication.

Figure 6:
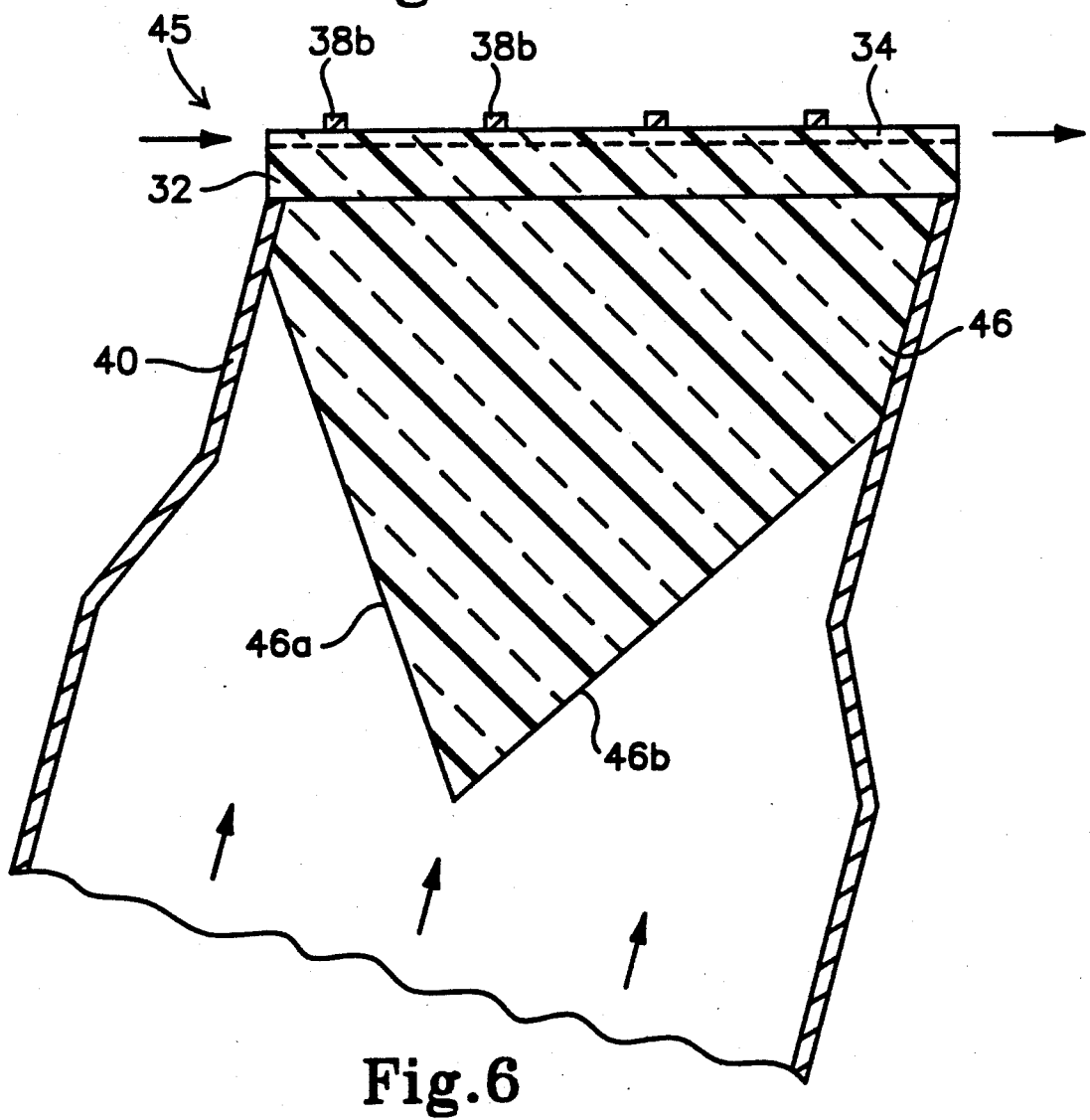
FIG. 6 is similar to FIG. 5, but illustrates an alternative method of electromagnetically driving the modulator through its substrate.

FIG. 6 illustrates another method of achieving impedance matching and thereby reducing undesired reflection of the electromagnetic signal. In a phase modulator 45, a block 46 of material having a dielectric constant which is substantially equal to that of the substrate 32 is mounted in the end portion of the waveguide 40. The block 46 has a cross sectional area as defined by tapered edges 46a and 46b which increases in the direction of propagation of the electromagnetic signal. The effective index of refraction for the signal thereby increases in proportion to the cross sectional area of the block 46, achieving impedance matching in a continuous manner, as opposed to a stepwise manner in the embodiment of FIG. 5. Such tapered matching usually results in broader operating bandwidths than the "quarter-wave layer" method.

Figure 7:
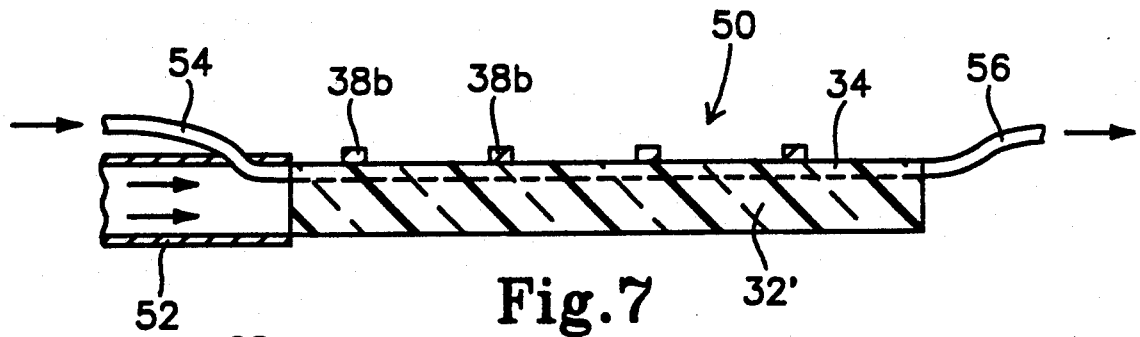
FIG. 7 is a sectional view illustrating the modulator of FIG. 4 as dimensioned to constitute a dielectric electromagnetic waveguide.

Whereas the electromagnetic signal is directed to the antennas 38 through the substrate 32 at the angle $\theta$, it is possible to configure the cross section of a substrate 32' illustrated in FIG. 7 to itself constitute an electromagnetic waveguide which causes the electromagnetic signal to propagate therethrough parallel to the optical waveguide at the phase velocity $c/n_o$. A phase modulator 50 embodying the present invention includes an electromagnetic waveguide 52 of any suitable configuration for directing the electromagnetic signal into the end of the substrate 32'. The optical signal is fed into the optical waveguide 34 by means of an optical fiber 54 which extends through a wall of the waveguide 52, and is coupled out of the optical waveguide 34 by means of an optical fiber 56. The electromagnetic signal propagating through the substrate 32' induces an electrical signal in the antennas 38, which is in turn coupled to and propagates along the electrodes 36 to modulate the optical signal propagating through the optical waveguide 34 in the manner discussed above.

The basic theory for computing the cross section of the substrate/electromagnetic waveguide 32' is set forth in a paper entitled "Dielectric Rectangular Waveguide and Directional Coupler for Integrated Optics", by E. Marcatili, in Bell System Technical Journal, vol. 48, no. 7, September 1969, pp. 2,071-2,103. Assuming that the substrate 32= has a width $\alpha$ and a thickness $\beta$, and an electrical modulation frequency of 10 GHz, the calculated dimensions for $\alpha$ and $\beta$ for various ratios of $\alpha/\beta$ are as follows based on Marcatili's theory:

| Ratio ($\alpha/\beta$) | $\alpha$ | $\beta$ |
|---|---|---|
| 1:1 | 3.5 mm | 3.5 mm |
| 2:1 | 4.3 mm | 2.1 mm |
| 4:1 | 6.2 mm | 1.5 mm |

The dimensions $\alpha$ and $\beta$ generally decrease in proportion to an increase in modulation frequency. At a frequency of 100 GHz, the values of $\alpha$ and $\beta$ are less than one millimeter. Thus, the embodiment of FIG. 7 may be limited to relatively low frequency applications due to dimensional constraints.

Figure 8:
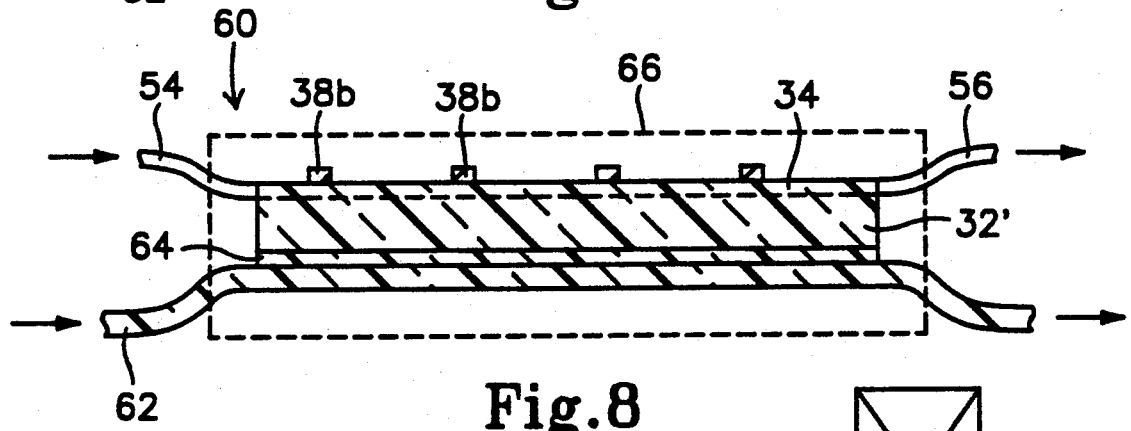
FIG. 8 is a sectional view illustrating the modulator as being electromagnetically driven by a parallel dielectric waveguide.

FIG. 8 illustrates another phase modulator 60 with different means for coupling the modulation signal to the substrate waveguide 32'. Like elements are designated by the same reference numerals used in FIG. 7. The modulator 60 differs from the modulator 50 in that the electromagnetic signal is applied by means of a separate dielectric waveguide 62 which extends parallel to the dielectric waveguide 32'. The dielectric constant and cross section of the waveguide 62 may be computed from Marcatili's theory such that the electromagnetic signal propagates through the waveguide 62 at the phase velocity $c/n_o$ and couples to substrate waveguide 32' in the fashion of a directional coupler. The spacing between the waveguides 62 and 32' may also be determined from the theory of directional coupling set forth in the Marcatili reference. The space between the waveguides 62 and 32' may be filled with a layer 64 of different dielectric constant to provide the proper coupling conditions. The entire assembly may then be encapsulated in an inert polymer block as indicated at 66, provided the dielectric constant of the polymer is taken into account in the design.

Figure 9:
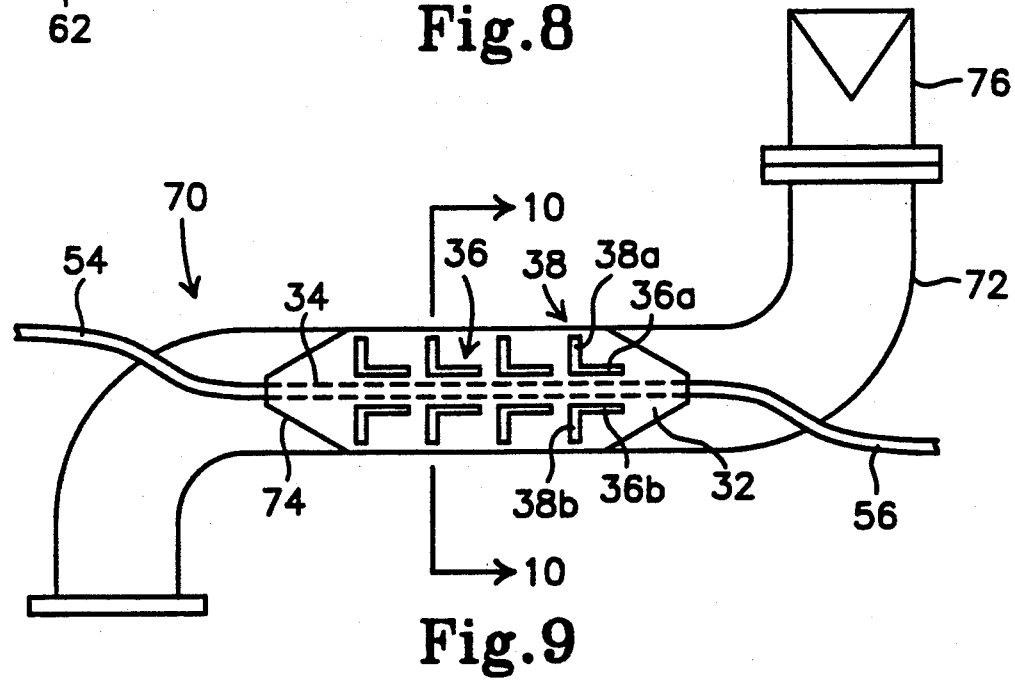
FIG. 9 is a sectional view illustrating the modulator as being enclosed in a parallel electromagnetic waveguide.
Figure 10:
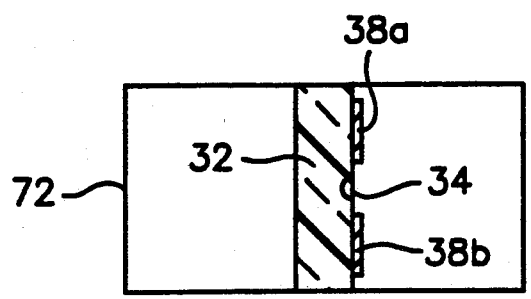
FIG. 10 is a section taken on a line 10—10 of FIG. 9.

FIG. 9 illustrates another phase modulator 70 embodying the present invention in which the substrate 32 is disposed inside an electromagnetic waveguide 72. The modulator substrate 32 becomes a dielectric "fin" which loads waveguide 72 and reduces its characteristic phase velocity. By proper choice of the substrate thickness, the phase velocity of the wave in the loaded waveguide 72 can be made equal to the phase velocity of the optical signal in the optical waveguide 34. Tapers 74 on the ends of the substrate 32 are employed to minimize reflection of the modulating wave at the input and output ends of the modulator substrate 32. A matched waveguide termination 76 absorbs the modulating wave and prevents reflections back into the modulator region.

Figure 11:
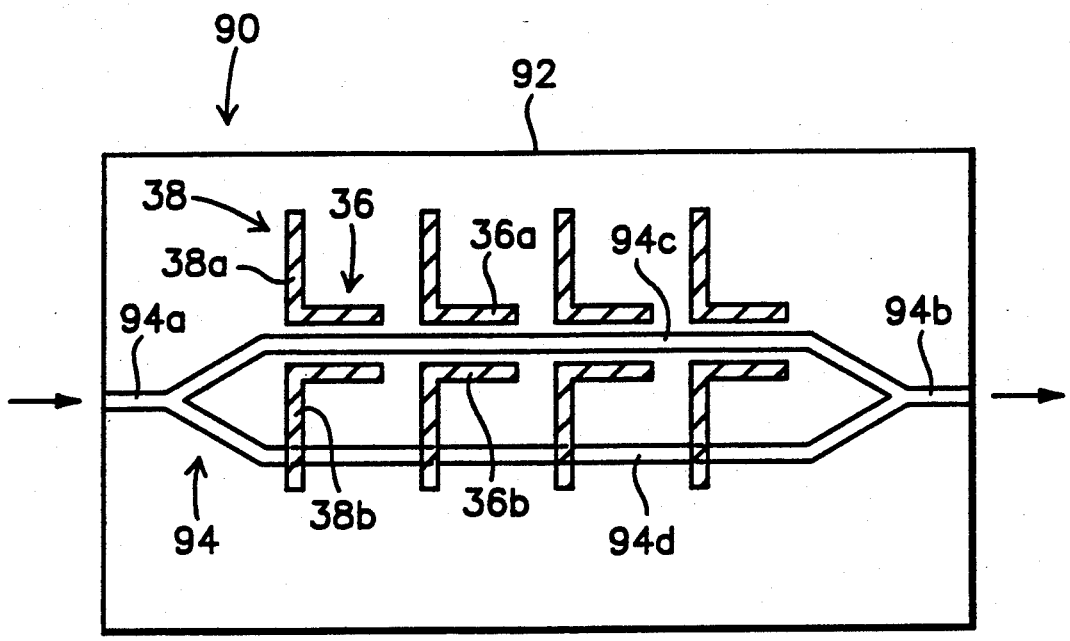
FIG. 11 is a plan view of a first embodiment of an electro-optic amplitude modulator embodying the present invention.

The embodiments of the invention described above are phase modulators. However, it is possible to convert a phase modulator to achieve amplitude modulation by various known means, including splitting the optical waveguide into two branches. FIG. 11 illustrates a Mach-Zehnder interferometer type amplitude modulator 90 embodying the present invention which includes a substrate 92 made of an electro-optic material as described above. An optical waveguide 94 is formed in the substrate 92, and includes an optical input 94a, an optical output 94b, and two branches 94c and 94d which split from the input 94a and merge at the output 94b. The electrodes 36 and antennas 38 are spaced along only the branch 94c.

The antennas 38 are illuminated with the electromagnetic signal using any of the configurations described above, and phase modulate the optical signal propagating through the branch 94c of the optical waveguide 94. The optical signal propagating through the branch 94d is unaffected by the electromagnetic signal and retains its original phase because the small regions where the antenna elements 38b overlap optical waveguide 94d will have little interaction length and thus can be ignored. The optical signals recombine at the output 94b and optically interfere with each other such that the amplitude of the optical signal at the output 94b varies in accordance with the relative phase difference between the interfering optical signals from the branches 94c and 94d.

Figure 12:
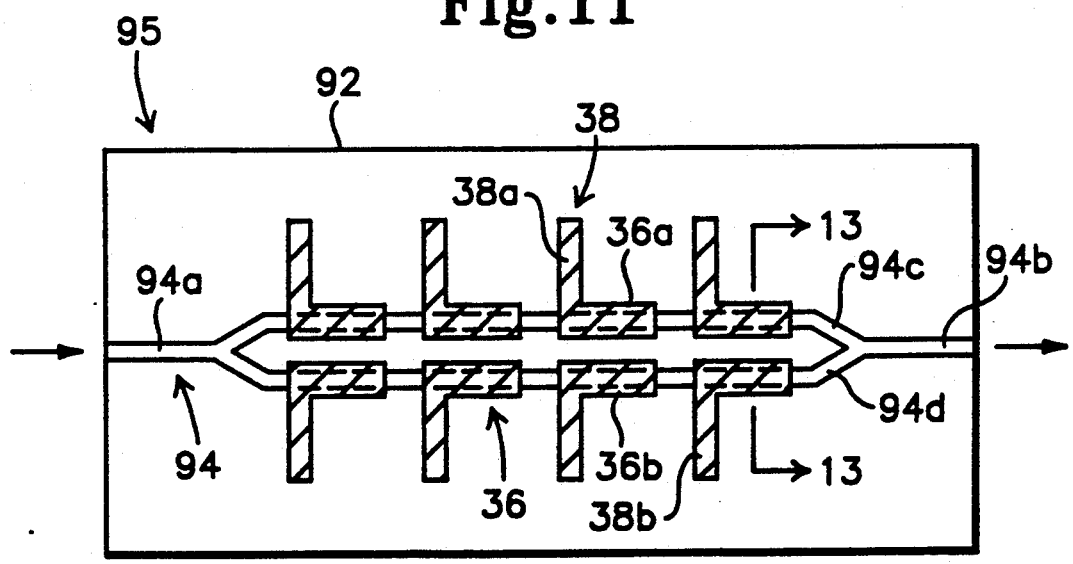
FIG. 12 is similar to FIG. 11, but illustrates a another embodiment of an electro-optic amplitude modulator.
Figure 13:
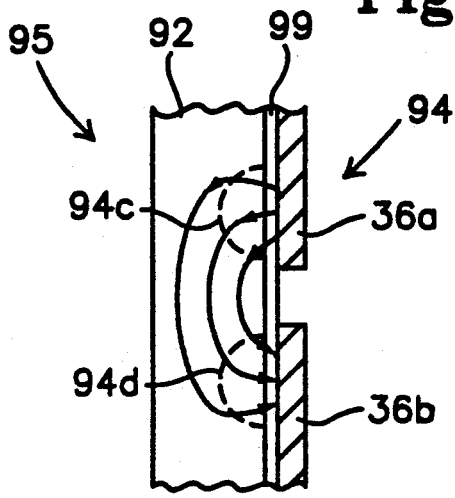
FIG. 13 is a sectional taken on a line 13—13 of FIG. 12.

FIGS. 12 and 13 illustrate another amplitude modulator 95 which is similar to the modulator 90 except that the segments 36a and 36b of the electrodes 36 and segments 38a and 38b of the antennas 38 are spaced along the branches 94c and 94d of the optical waveguide 94 respectively. The operation of the modulator 95 is similar to that of the modulator 90 except that equal and opposite phase modulation occurs in the branches 94c and 94d of the optical waveguide 94, rather than phase modulation in one branch and no phase modulation in the other branch. This arrangement is appropriate for Z-cut orientation of the modulator substrate, in which the electro-optic modulation is sensitive to the transverse component of the modulating field normal to the surface. An insulating $SiO_2$ buffer layer 99 isolates the optical wave from the overlying metal electrodes to reduce optical losses.

Figure 14:
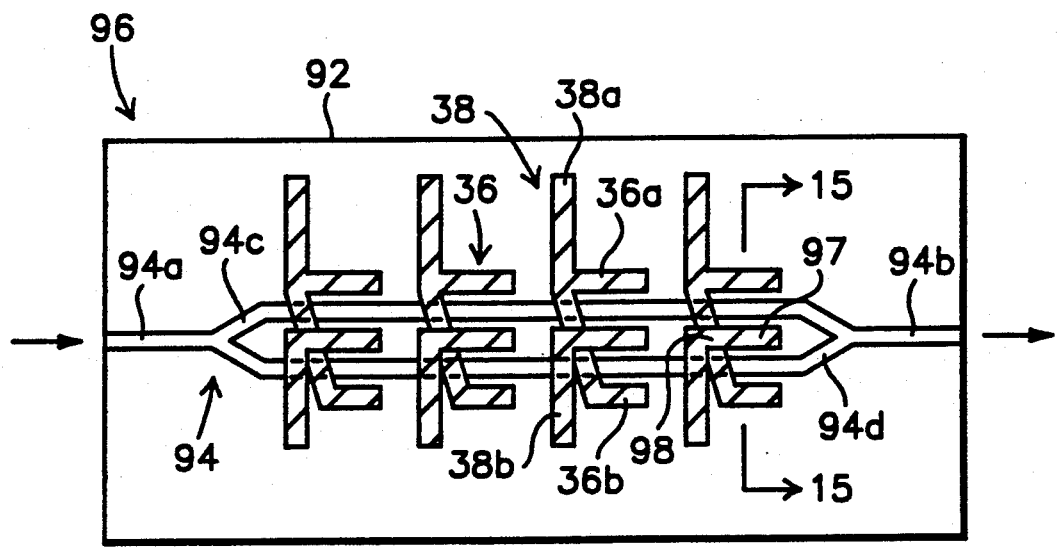
FIG. 14 is also similar to FIG. 11, but illustrates a another embodiment of an electro-optic amplitude modulator.
Figure 15:
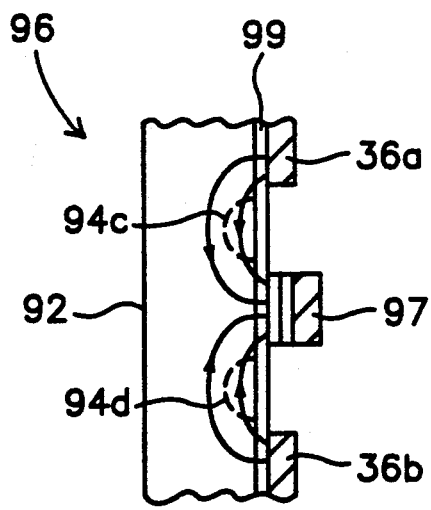
FIG. 15 is a sectional taken on a line 15—15 of FIG. 14.

FIGS. 14 and 15 illustrate a modification of the electrode and antenna arrangement appropriate for X-cut orientation of the modulator substrate, where the electro-optic modulation is sensitive to the transverse component of the modulating field parallel to the surface. A modulator 96 includes a third electrode 97 which is connected as shown to provide the proper phase relationship for the modulating field for the two optical waveguide branches 94c and 94d. The electrode 97 is connected to one of the antenna elements 38b while the two outer electrodes 36a and 36b are connected together and further connected to the other antenna element 38a. An additional insulating layer of $SiO_2$ is required in a crossover region 98 to prevent shorting the antenna terminals. This will require two separate depositions for the metal antenna and modulating electrodes, with an intervening deposition of an insulating layer.

EXAMPLE

Figure 16:
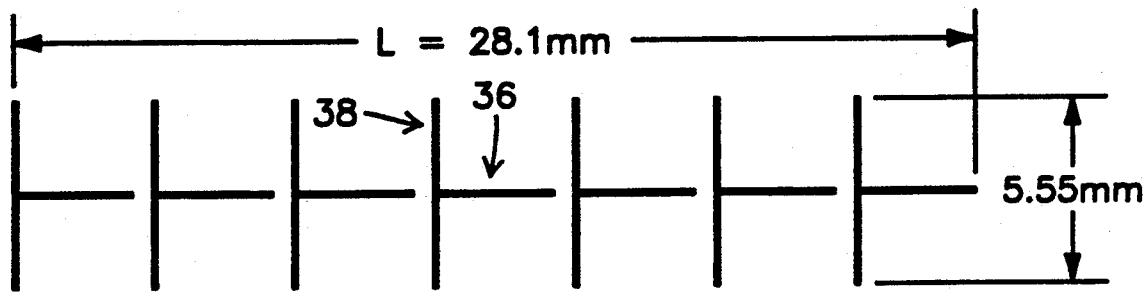
FIGS. 16 to 18 are plan views at progressively enlarged scale illustrating an EXAMPLE of the present invention.
Figure 17:
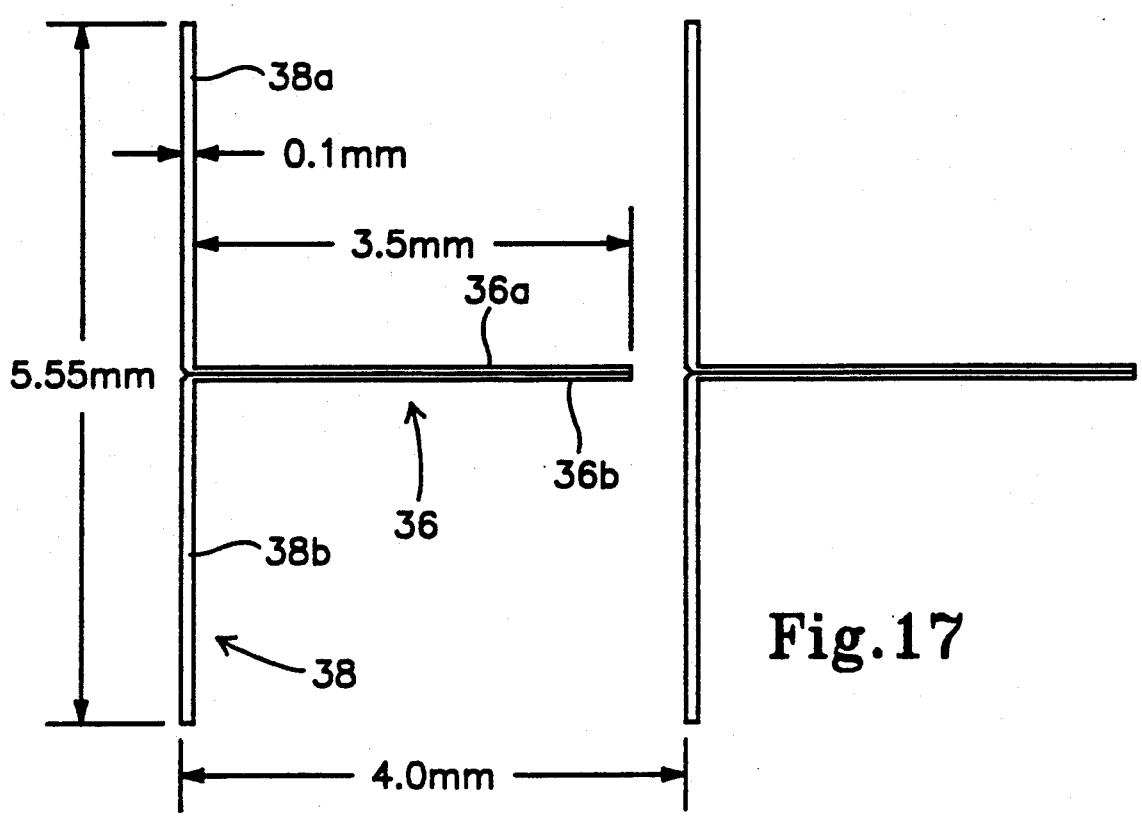
Figure 18:
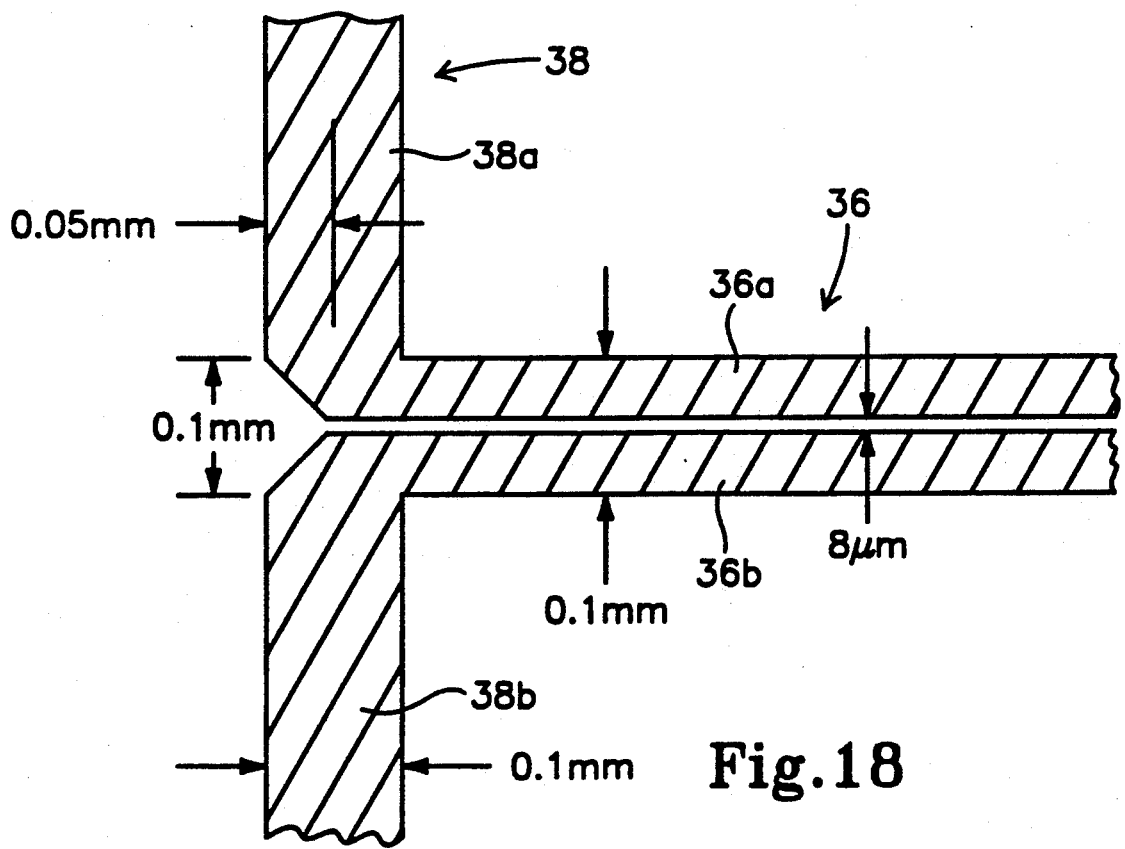
Figure 14:
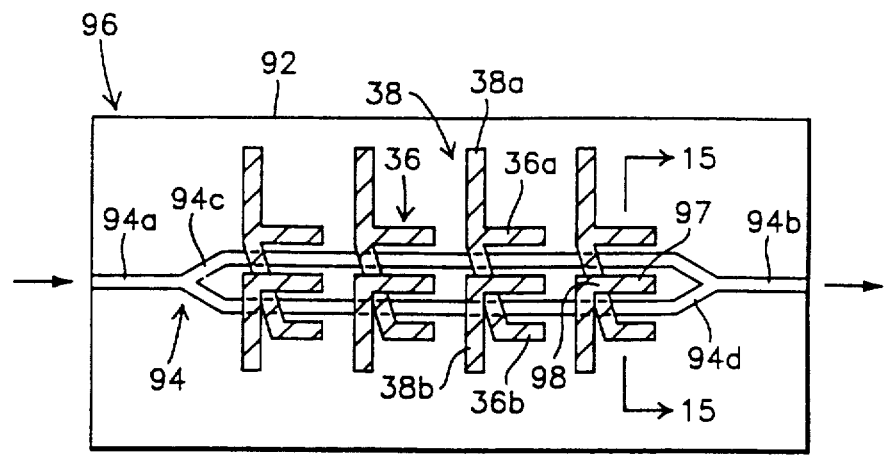
Figure 15:
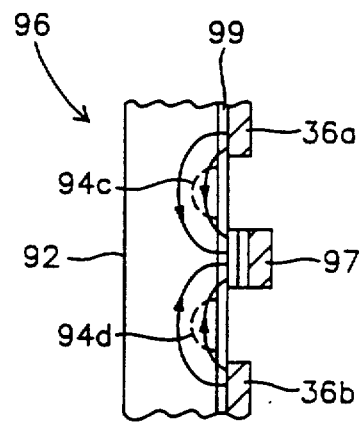
Figure 16:
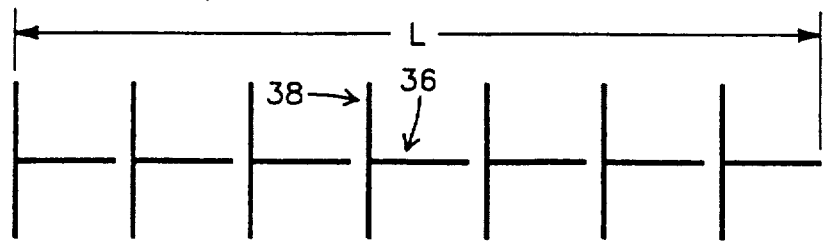
Figure 17:
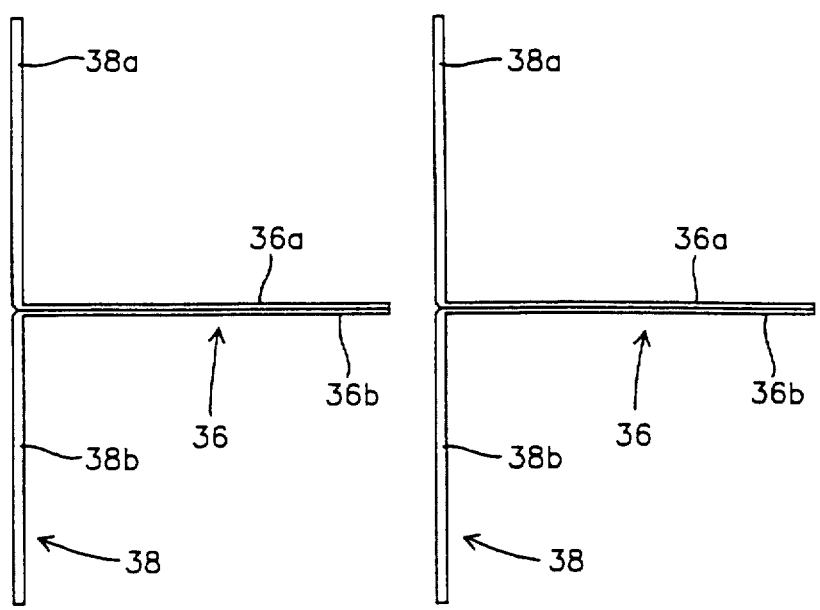
Figure 18:
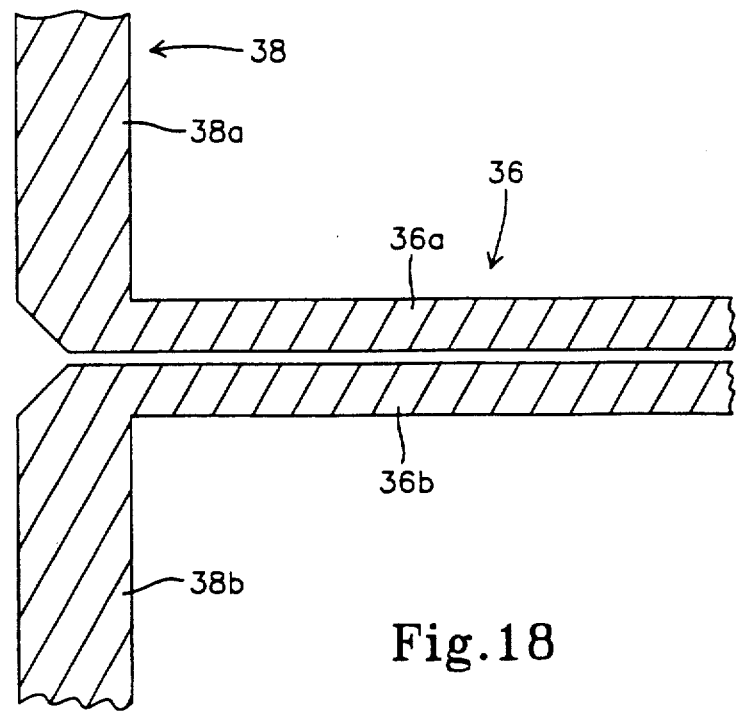

A phase modulator having the configuration illustrated in FIG. 4 was constructed on a $LiNbO_2$ substrate for operation at an optical wavelength of 633 nm and an electrical modulating frequency of 10 GHz. The dimensions of the modulator are illustrated in FIGS. 16 to 18. The optical interaction length L was 28.1 mm. Seven electrodes 36 were provided within the interaction length L, each of which was 3.5 mm long. The longitudinal spacing between the electrodes 36 was 4.0 mm. The width of the two segments 36a and 36b of the electrodes 36 in combination was 0.1 mm, with a gap of 8 microns between the segments. The antennas 38 had the configuration of two half wave dipoles in phase. The span of the two segments 38a and 38b in combination was 5.55 mm. The width of the segments was 0.1 mm.

The modulator was illuminated with an electromagnetic wave using an open ended waveguide in the manner illustrated in FIG. 5, and operated effectively even with inefficient radiative coupling. Peak-to-peak phase modulation of 48° was achieved with 126 mW of microwave electromagnetic power.

While several illustrative embodiments of the invention have been shown and described, numerous variations and alternate embodiments will occur to those skilled in the art, without departing from the spirit and scope of the invention. Accordingly, it is intended that the present invention not be limited solely to the specifically described illustrative embodiments. Various modifications are contemplated and can be made without departing from the spirit and scope of the invention as defined by the appended claims.

I claim:

1. An electro-optic modulator comprising:
a substrate formed of an electro-optic material;
an optical waveguide formed in the substrate;
a plurality of electrodes spaced along the optical waveguide; and
a plurality of antennas connected to the electrodes respectively to receive an electromagnetic signal by electromagnetic induction and deliver the received electromagnetic signal for propagation along the respective electrodes and modulation of an optical signal propagating through the optical waveguide.

2. A modulator as in claim 1, in which:
each electrode comprises first and second segments which are spaced on opposite sides of the optical waveguide respectively; and
each antenna comprises first and second segments connected to the first and second segments of the waveguide respectively.

3. A modulator as in claim 2, in which the first and second segments of each antenna extend transversely outward from upstream ends of the first and second segments of the respective electrode.

4. A modulator as in claim 2, in which:
the optical waveguide comprises:
an optical input;
first and second branches which extend from the optical input; and
and an optical output at which the first and second branches merge;
the first segments of the electrodes are spaced along the first branch of the optical waveguide; and
the second segments of the electrodes are spaced along the second branch of the optical waveguide.

5. A modulator as in claim 4, in which the first and second segments of each antenna extend transversely outwardly from upstream ends of the first and second segments of the respective electrode.

6. A modulator as in claim 2, in which:
the optical waveguide comprises:
an optical input;
first and second branches which extend from the optical input; and
and an optical output at which the first and second branches merge; and
the first and second segments of the electrodes are spaced along the first branch of the optical waveguide.

7. A modulator as in claim 6, in which the first and second segments of each antenna extend transversely outwardly from upstream ends of the first and second segments of the respective electrode.

8. A modulator as in claim 1, further comprising an electromagnetic waveguide for directing the electromagnetic signal to the antennas.

9. An electro-optic modulator comprising:
a substrate formed of an electro-optic material;
an optical waveguide formed in the substrate;
a plurality of electrodes spaced along the optical waveguide;
a plurality of antennas connected to the electrodes respectively to deliver received electromagnetic signals for propagation along the respective electrodes and modulation of an optical signal propagating through the optical waveguide; and
an electromagnetic waveguide for directing the electromagnetic signal to the antennas;
the electromagnetic waveguide being oriented at a predetermined angle to the optical waveguide selected to cause the electromagnetic signal to propagate through the substrate in such a direction that the phase velocity of the electromagnetic wave along the direction of the optical waveguide is substantially equal to the phase velocity of the optical signal propagating through the optical waveguide.

10. A modulator as in claim 9, in which the predetermined angle is selected such that the electromagnetic waveguide directs the electromagnetic signal to the antennas through the substrate.

11. A modulator as in claim 10, further comprising impedance matching means disposed between the electromagnetic waveguide and the substrate for preventing reflection of the electromagnetic signal from the substrate back into the electromagnetic waveguide.

12. A modulator as in claim 11, in which the impedance matching means comprises a plurality of material layers having respective dielectric constants which increase along the direction of propagation of the electromagnetic signal.

13. A modulator as in claim 11, in which the impedance matching means comprises a material having a dielectric constant which is substantially equal to the dielectric constant of the substrate, and a cross sectional area which increases along the direction of propagation of the electromagnetic signal.

14. A modulator as in claim 1, in which the substrate has a predetermined cross section which causes the electromagnetic signal to propagate therethrough parallel to the optical waveguide at a phase velocity which is substantially equal to the phase velocity of the optical signal propagating through the optical waveguide.

15. A modulator as in claim 1, further comprising a dielectric waveguide disposed adjacent to the substrate and extending substantially parallel to the optical waveguide for inducing the electromagnetic signal into the antennas.

16. A modulator as in claim 15, in which the dielectric waveguide has a predetermined cross section and dielectric constant which cause the electromagnetic signal to propagate therethrough at a phase velocity which is substantially equal to the phase velocity of the optical signal propagating through the optical waveguide.

17. A modulator as in claim 1, further comprising an electromagnetic waveguide which encloses the substrate and extends substantially parallel to the optical waveguide for inducing the electromagnetic signal into the antennas, the electromagnetic waveguide having a predetermined cross section which causes the electromagnetic signal to propagate therethrough at a phase velocity which is substantially equal to the phase velocity of the optical signal propagating through the optical waveguide.

* * * * *

UNITED STATES PATENT AND TRADEMARK OFFICE
CERTIFICATE OF CORRECTION

PATENT NO. : 5,076,655
DATED : December 31, 1991
INVENTOR(S) : WILLIAM B. BRIDGES It is certified that error appears in the above-identified patent and that said Letters Patent is hereby corrected as shown below:

IN THE DESCRIPTION OF THE DRAWINGS, column 4, line 20, after the word "illustrates" delete the word --a--; and
column 4, line 24, after the word "illustrates" delete the word --a--.

IN THE DRAWINGS, please replace printed FIGs. 16-18 with corrected FIGs. 16-18 enclosed herewith.

IN THE DETAILED DESCRIPTION OF THE INVENTION, column 7, line 24, after "substrate 32" delete the " = " and insert therefor -- ' --.

Signed and Sealed this

Nineteenth Day of October, 1993

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,076,655

DATED : December 31, 1991

INVENTOR(S) : William B. Bridges

It is certified that error appears in the above-indentified patent and that said Letters Patent is hereby corrected as shown below:

On the title page, item [73], after "Calif." add --California Institute of Technology, Pasadena, Calif.--.

Signed and Sealed this

Twenty-third Day of August, 1994

Attest:

BRUCE LEHMAN

Attesting Officer

Commissioner of Patents and Trademarks